Figure 1:
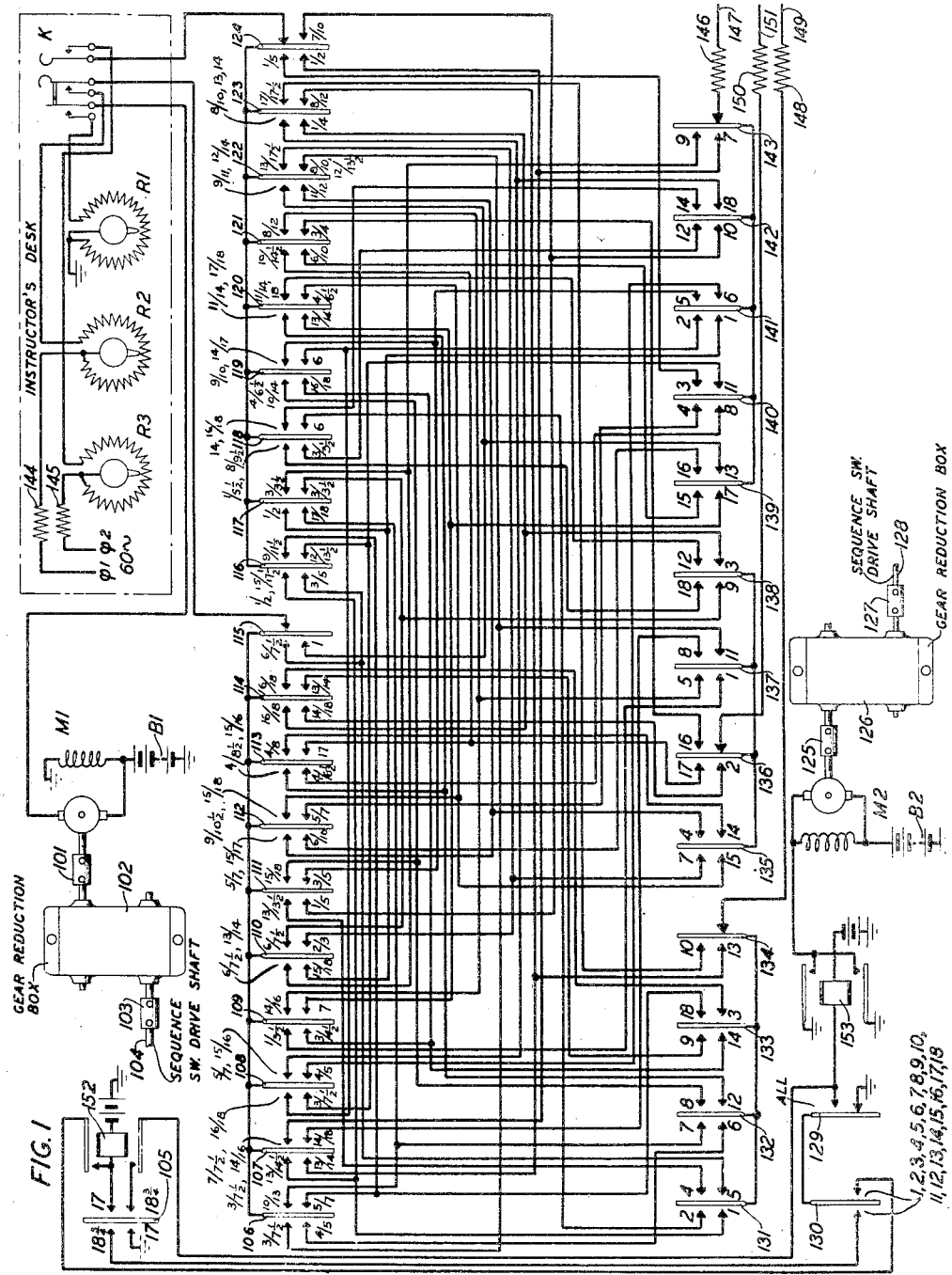

Feb. 1, 1949.　　　　C. E. GERMANTON　　　　2,460,743
AIRCRAFT PERSONNEL TRAINER
Filed June 30, 1944　　　　　　　　　　　　4 Sheets-Sheet 1

INVENTOR
C. E. GERMANTON
BY
P. C. Smith
ATTORNEY

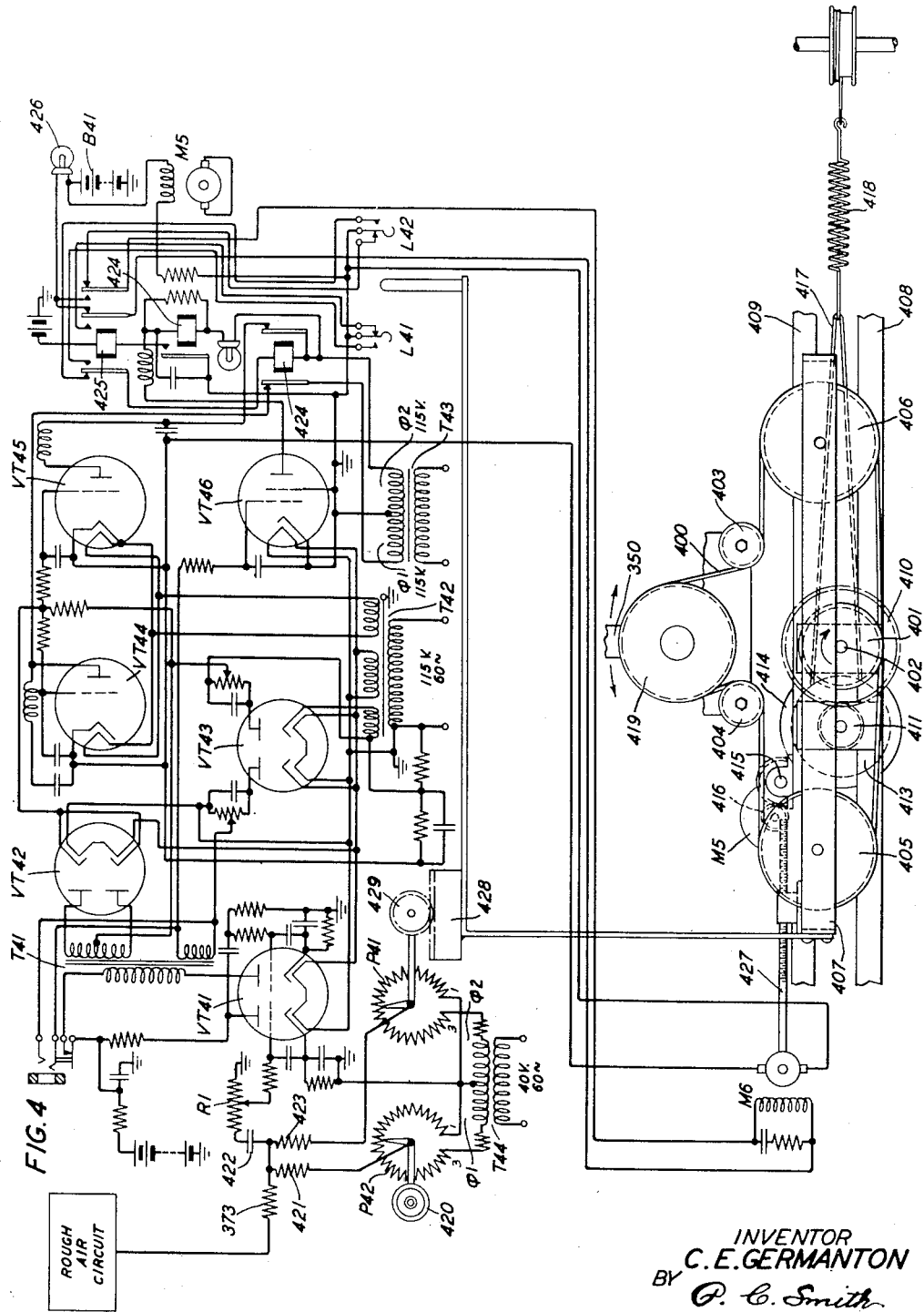

Patented Feb. 1, 1949

2,460,743

UNITED STATES PATENT OFFICE 2,460,743

AIRCRAFT PERSONNEL TRAINER

Charles E. Germanton, Summit, N. J., assignor to Bell Telephone Laboratories, Incorporated, New York, N. Y., a corporation of New York Application June 30, 1944, Serial No. 542,982

14 Claims. (Cl. 35—12)

This invention relates to aircraft trainers and more particularly to apparatus for simulating in the operation of the controls the reactions which a pilot would receive in the operation of an actual aircraft due to the encountering of rough air conditions.

In the control of an aircraft the pilot feels resistance to the operation of the stick or yoke, of the aileron wheel if provided separate from the yoke, and of the rudder pedals, which varies in accordance with the pressure of the slip stream against the control surfaces of the elevator, of the ailerons and of the rudder and this resistance is a function of the air speed of the aircraft and of the attitude of the aircraft. For example, when the pilot pulls the stick back to execute a climbing maneuver or pushes it forward to execute a diving maneuver the elevator is moved out of its normal plane and therefore becomes engaged by the slip stream to a greater or less extent dependent upon the steepness of the intended climb or dive and the pressure of the slip stream upon the elevator surface reacts as a resistance to the movement of the elevator which is transferred to the stick as a resistance to be overcome by the pilot in moving the stick. Similarly, on a correctly executed turn, the movement of the rudder from its normal straight flight position subjects its surface to the pressure of the slip stream which reacts as a resistance to the movement of the rudder which is transferred to the rudder pedals as a resistance to be overcome by the pilot in their movement and, the movement of the ailerons from their normal positions subjects their surfaces to a change in pressure from the slip stream which reacts as a resistance to their movement which is transferred to the aileron control wheel or stick as a resistance to be overcome by the pilot in the movement of the wheel or stick. Also since some elevator control is also required on a correctly executed turn, the pilot will encounter some resistance to the forward or backward movement of the stick. At other times the movement of the controls does not meet as great resistance transmitted thereto by pressures applied against the control surfaces. The resistance to the movement of the control surfaces is a function of the air speed of the aircraft and in general increases as the air speed increases.

In the copending application of V. F. Bohman, R. C. Davis and C. E. Germanton, Serial No. 542,984 filed concurrently herewith apparatus is disclosed and described for applying loadings or resistances to the operation of the stick, the aileron control wheel and the rudder pedals of an aircraft trainer simulating the resistances to the movement of the similar controls of an actual aircraft under flight conditions.

In flight through rough air the pressures against the control surfaces of the elevator, rudder and ailerons will be more or less erratic resulting in a transference of changing resistances to the movement of the controls and resulting in changing readings of the artificial horizon and bank indicator, altimeter, rate of climb indicator and rate of turn indicator on the instrument panel of the aircraft. An experienced pilot is able to manipulate the controls to overcome to a great extent the effect of the rough air reactions upon the controls and to keep the aircraft in substantially steady flight.

It is the object of the present invention to simulate in an aircraft trainer the change in loading or resistance to the movement of the controls of an actual aircraft subjected to flight in rough air and to simulate the effect of rough air on the readings of the instruments of the trainer.

To attain this object the trainer is provided with mechanisms controlled by motor control circuits which apply loadings to the elevator control stick, to the aileron control wheel and to the rudder control pedals which loadings are made to vary in accordance with the indicated air speed. Motor control circiuts are provided for operating the rate of turn indicator, and the artificial horizon and bank indicator on the pilot's instrument panel of the trainer and a further motor control circuit is provided for operating potentiometers which exercise control over other motor control circuits of the trainer. In addition, and as the main feature of novelty of the present invention, a motor control circuit is provided which promiscuously exercises control over the aforementioned motor control circuits to change the loadings on the elevator control stick, on the aileron control wheel and on the rudder control pedals, to change the settings of the instruments and to change the interacting effects between such motor control circuits of the trainer as would be affected by the encountering of rough air conditions. This latter motor control circuit comprises two motor driven sequence switches of the general type disclosed in Patent No. 1,127,808 granted February 9, 1915, to J. N. Reynolds and C. F. Baldwin. One of these switches is operable under the control of a start key through any desired number of complete revolutions and upon the completion of each revolution to cause the second switch to advance one step, said second switch completing a single revolution in response to the completion of eighteen revolutions of the first switch. Conjointly the two switches are effective to apply alternating current of one phase or of the opposite phase for varying intervals and in a promiscuous manner to control conductors connected to the aforementioned motor control circuits whereby the motors of such circuits are operated in one or the other direction of rotation and to varying extents to change the loadings, to change the instrument readings and to vary the controls on other circuits of the trainer.

The start key together with three manually operable rheostats are located on an instructor's desk. One of the rheostats may be operated to adjust the speed of rotation of the motor which drives one of the sequence switches and which thereby controls the duration of each cycle of operation of the rough air circuit. The two other rheostats are connected in series with the alternating current supplies of opposite phases $\varphi 1$ and $\varphi 2$ for regulating the potentials applied from such sources to the rough air circuit.

Although the switches of the rough air circuits have been illustrated as of the sequence switch type it is to be understood that other types of switches such, for example, as switches of the type which are advanced step by step under the control of stepping magnets could be used.

Figure 2:
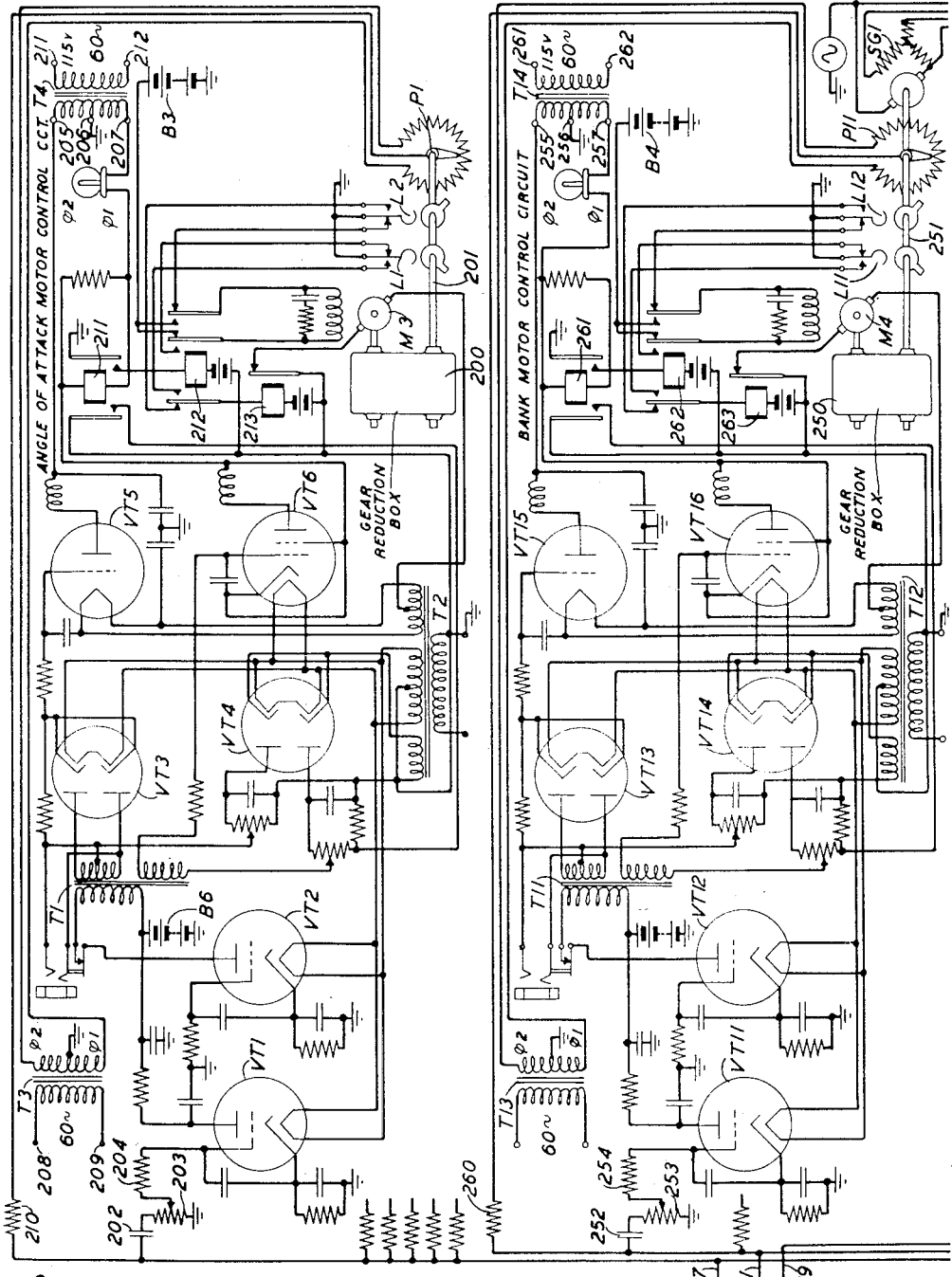
Figure 3:
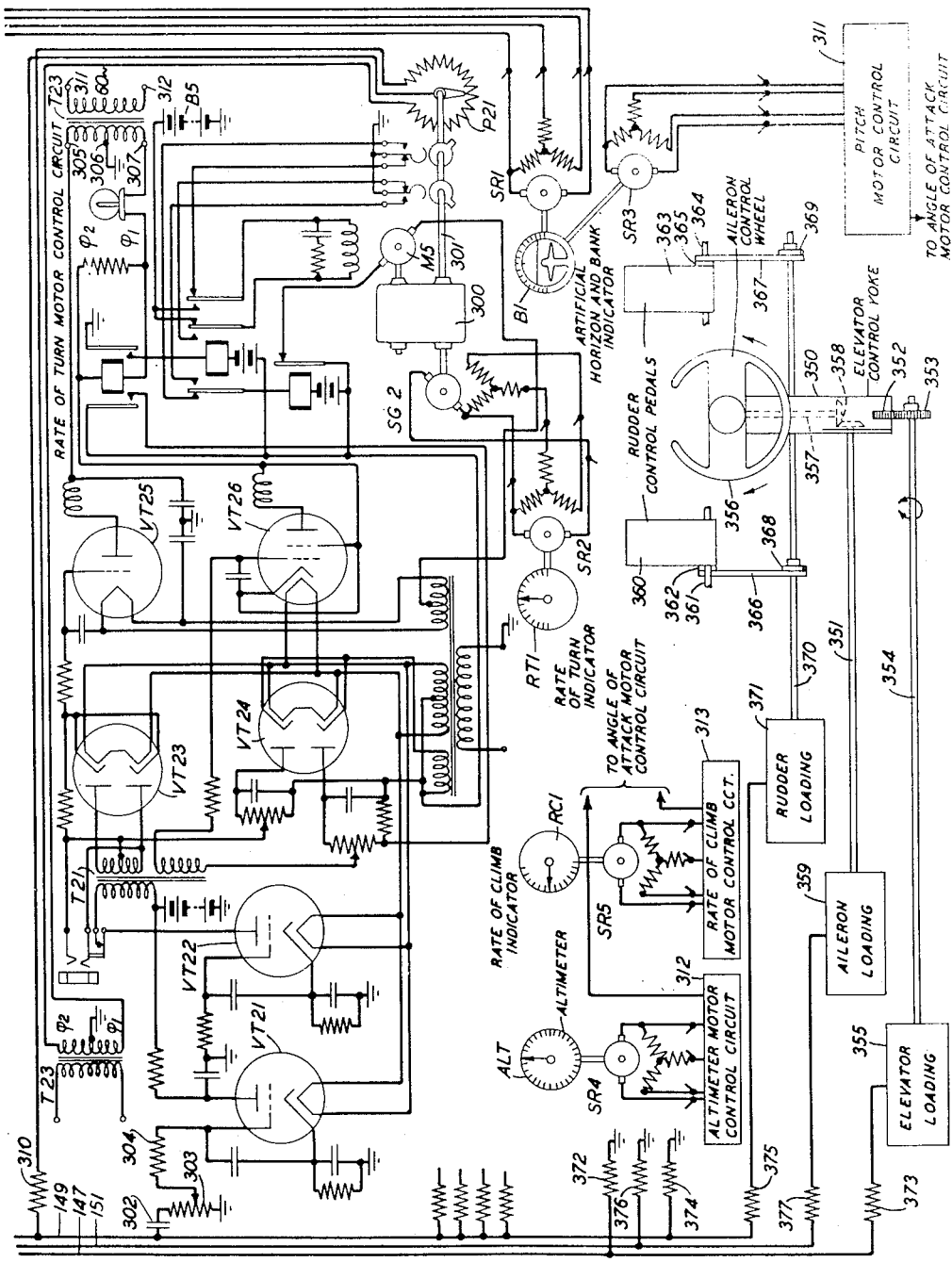

The novel features of the invention are set forth in the appended claims and the invention as to its organization and its mode of operation will be best understood from a consideration of the following detailed description when read in connection with the accompanying drawings in which:

Fig. 1 shows the rough air circuit embodying the present invention together with manual controls disclosed in the dot-dash rectangle in the upper right corner thereof;

Fig. 2 shows in the upper portion thereof the angle of attack motor control circuit for operating potentiometers for controlling other motor control circuits of a trainer and in the lower portion thereof the bank motor control circuit for operating potentiometers for controlling other motor control circuits and for operating the bank indicator of an artificial horizon instrument on the instrument panel of the trainer;

Fig. 3 shows in the upper portion thereof the rate of turn motor control circuit for operating potentiometers for controlling other motor control circuits and for operating a rate of turn indicator instrument on the instrument panel of the trainer and in the lower portion thereof the schematic representation of the elevator control yoke or stick, the aileron control wheel, the rudder control pedals and the loading mechanisms therefor; and Fig. 4 shows one of the control loading mechanisms indicated schematically by the boxes in the lower portion of Fig. 3 and the motor control circuit therefor.

Referring first to Fig. 1, the motors M1 and M2 are of the shunt field direct current type operable from the sources B1 and B2 of direct current which sources and the sources B3, B4 and B5 shown in Figs. 2 and 3, may be a common source. The motor M1 is started by the start key K located on the instructor's desk and its speed is regulated by the manually operable rheostat R1. The shaft of the motor M1 is connected by a coupling 101 to the driving shaft of the reduction gear box 102, the driven shaft of which is connected by a coupling 103 to the driving shaft 104 of the first sequence switch having the contact closing cams 105 to 124, inclusive.

The shaft of motor M2 is coupled by coupling 125 to the driving shaft of the reduction gear box 126, the driven shaft of which is connected by a coupling 127 to the driving shaft 128 of a second sequence switch having the contact closing cams 129 to 143, inclusive. Each of the sequence switches has eighteen contact closing positions each of which positions may provide different circuit combinations. It can be designed to stop in any one of these positions. Cams 105 to 124, inclusive, and cams 130 to 143, inclusive, are so cut that in any contact closure position, indicated by the small numerals placed on either side of such cams, the contact becomes closed 5 degrees before the indicated position is reached and is again opened 5 degrees after the indicated position has been left. For example, referring to cam 115 the position marked 1 becomes closed 5 degrees earlier or in position ¾ and becomes opened 5 degrees later or in position 1¼ and the position marked 6–7½ becomes closed in position 5¾ and remains closed through position 7¾. Cam 129 is so cut that it is closed in all positions except when the switch is centered in any one of its regular stopping positions. The motors M1, M2, gear boxes 102 and 126 and the sequence switches may all be mounted on a suitable mounting plate.

The rheostats R1, R2 and R3 and the start key K are located on the instructor's desk, the key K controlling the starting circuit of the motor M1 over the speed controlling rheostat R1 as previously described and also controlling the application of current from phases $\varphi 1$ and $\varphi 2$ of an alternating current source over the rheostats R2 and R3, cams 106 to 115, inclusive, and cams 116 to 124, inclusive, the rheostats R2 and R3 being effective to adjust the potential of the current of the two phases.

The motor control circuits disclosed in Figs. 2, 3 and 4 are of the type fully disclosed in the Patent No. 2,428,767 granted October 14, 1947, to W. P. Albert, R. C. Davis, R. H. Gumley and W. H. T. Holden. Each of these circuits is provided with a direct current motor such as motor M3 which, through a gear reduction box 200, drives the shaft 201 on which are mounted variable potentiometers (not shown) similar to P1 for controlling other motor control circuits of the trainer, a balancing potentiometer P1 and a pair of limit switches L1 and L2. The shaft of the bank motor control circuit shown in the lower portion of Fig. 2 and the rate of turn motor control circuit shown in the upper portion of Fig. 3 also drive synchro-generators which are effective to drive synchro-repeaters electrically associated therewith and mechanically coupled to indicating instruments on the instrument panel of the trainer and on the instrument panel of the instructor's desk.

For controlling the motor of each control circuit whereby the motor may be driven in either direction of rotation, two incoming signal amplifying tubes, such as VT1 and VT2, two dual rectifier tubes, such as VT3 and VT4 and two gas-filled tubes, such as VT5 and VT6 and three relays, such as 211, 212 and 213, are provided. The tubes VT1 and VT2 are connected in tandem and serve to receive an input potential and to apply it through the step-up transformer T1 to the anodes of the rectifier tube VT3. The tube VT3 serves as a full wave rectifier to rectify the input potential applied to its anodes and to apply it as positive potential to the grid of the gas-filled tube VT5. The output potential from tube VT2 is also applied through the lower secondary winding of transformer T1 to the control grid of the gas-filled tube VT6.

Filament heating current for all of these tubes is supplied from a source of commercial alternating current supply through the windings of power transformer T2 and direct current for furnishing grid bias to the control grids of tubes VT5 and VT6 is supplied from the alternating current source through the power transformer T2 and the dual rectifier tube VT4. Anode potential is supplied to tubes VT1 and VT2 from the battery B6 and 60-cycle alternating current potential is supplied to the anodes of tubes VT5 and VT6, the anode potential supplied to tube VT6 being displaced 180 degrees in phase from the potential supplied to tube VT5.

The yoke or stick 350 of the trainer is disclosed schematically in the lower portion of Fig. 3 as rotatable around the shaft 351 as an axis and is operable, through the sector gear 352 secured to the lower end of the yoke and the gear 353 in mesh therewith, to rotate the shaft 354 to control potentiometers (not disclosed) operable to control circuits of the trainer in response to the movement of the yoke in simulation of the operation of the elevator of an aircraft. The shaft 354 is also disclosed as extending into a box 355 schematically representing the elevator loading or trimming mechanism and motor control circuit therefor fully disclosed in the copending application of Bohman et al. hereinbefore referred to.

The yoke 350 has at its upper end an aileron control wheel 356 which through bevel gears (not shown) rotates the axial shaft 357 supported within the tubular yoke and geared by the bevel gears 358 to the shaft 351. The clockwise or counter-clockwise rotation of wheel 356 is thus communicated to the shaft 351 and may be employed to control potentiometers (not disclosed) operable to control circuits of the trainer in simulation of the operation of the ailerons of an aircraft. The shaft 351 is also disclosed as extending into a box 359 schematically representing the aileron loading or trimming mechanism and motor control circuit therefor fully disclosed in the copending application of Bohman et al. hereinbefore referred to.

The rudder control pedals 360 and 363 are mounted on individual rocker shafts 361 and 364, the shaft 361 having a downwardly extending arm 362 and the shaft 364 having an upwardly extending arm 365, such arms being connected respectively by rods 366 and 367 with upwardly extending arms 368 and 369 secured to the shaft 370. Thus the depression of the right pedal 363 causes a clockwise rotation of the shaft 370 and the depression of the left pedal 362 causes a counter-clockwise rotation of shaft 370. The clockwise or counter-clockwise rotation of shaft 370 may be employed to control potentiometers (not disclosed) operable to control circuits of the trainer in simulation of the operation of the rudder of an aircraft. The shaft 370 is also disclosed as extending into a box 371 schematically representing the rudder loading or trimming mechanism and motor control circuit therefor fully disclosed in the copending application of Bohman et al. hereinbefore referred to.

It is to be understood, however, that the control devices have been disclosed schematically and that their movements could be communicated to the shafts 351, 354 and 370 in any suitable manner and preferably in the manner employed in the particular aircraft which the trainer is designed to simulate for training purposes.

It will be assumed that the motor circuits disclosed in Figs. 2 and 3 are in balance and that the motors M3, M4 and M5 thereof are therefore not operating. It will also be assumed that the instructor desires to introduce a rough air condition into the simulated flight being flown by a pilot trainee to ascertain if the trainee reacts correctly to the imposed condition. It will be assumed further that the rheostats R1, R2 and R3 at the instructor's desk are adjusted into the positions disclosed and that to start the rough air circuit the instructor operates the key K. With the key K operated the source of phase φ1 alternating current is connected through resistance 144, through rheostat R2, the middle contacts of key K and over the right contact of cam 115 to all cams of the group 106 to 115, inclusive. The source of phase φ2 alternating current is connected through resistance 145, through rheostat R3, the right contacts of key K and over the upper right contact of cam 124 to all cams of the group 116 to 124, inclusive, and a circuit is established from ground through rheostat R1, over the left contacts of key K and through the rotor winding of motor M1 to ground through the source of direct current B1. With the stator winding of motor M1 energized from the source B1, motor M1 now operates and through the reduction gear box 102 drives the shaft 104 of the first sequence switch at a slow speed determined by the speed of the motor as regulated by the rheostat R1. The rotation of the sequence switch shaft rotates the cams 105 to 124, inclusive.

The cams of the sequence switches may be in any one of their eighteen contact closure positions at the time they are started into rotation but for clarifying the description it will be assumed that the cams of the upper sequence switch, which will hereinafter be identified by the motor designation M1, are driven into the No. 1 contact position when the motor is started as just described and that the cams of the lower sequence switch, which will hereinafter be identified by the motor designation M2, are standing in the No. 1 contact position. As switch M1 passes through positions 1 and 2 a circuit is established from the φ2 source of alternating current connected to cam 117, over its upper left contact closed in positions 1 through 2, over the lower left contact of cam 141, the right contact of cam 143, through resistance 146, over conductor 147, through condenser 202 and rheostat 203 to ground and in parallel therewith to ground through resistance 372 and also in parallel therewith through resistance 373 to the motor control circuit associated with the elevator loading mechanism 355.

The potential derived from the rheostat 203 is applied through resistance 204 to the control grid of tube VT1, is amplified thereby and by the tube VT2 and is then impressed through the transformer T1 and through rectifier tube VT3 upon the control grid of tube VT5 and over the lower secondary winding of transformer T1 also upon the control grid of tube VT6. The signal potential incoming from the rough air circuit now appears as potential of phase φ1 on the control grids of tubes VT5 and VT6 and since the tube VT3 serves as a full wave rectifier the potential applied to the grid of tube VT5 appears as a positive potential. Alternating current from the source of phase φ2, connected between the terminals 205 and 206, is at this time applied to the anode of tube VT5 but, due to the fact that tube VT3 rectifies both half waves of the signal potential, during one-half wave of the anode potential of phase φ2, both the grid and anode of tube VT5 will be positive and the tube will fire resulting in the transmission of an impulse of positive potential through the rotor winding of motor M3 during each positive half wave of the anode current. The circuit through the rotor winding may be traced from terminal 205 over the anode-cathode path through tube VT5, to the mid-point of the right secondary winding of transformer T2, through the rotor winding, over the back contact of relay 213 and returning to the ground terminal 206.

At the time that the signal potential of phase φ1 is impressed from the lower secondary winding of transformer T1 upon the grid of tube VT6 the anode of tube VT6 is supplied with anode potential from the alternating current source of phase φ1 connected between the terminals 206 and 207 through the winding of reversing relay 211 and tube VT6 will therefore fire during each positive half wave of the anode potential in turn causing the operation of relay 212. With relay 212 operated the stator winding M of motor M3 is energized in a circuit extending from ground through the direct current source B3, over the outer right front contact of relay 212, through the stator winding of motor M3, over the inner right front contact of relay 212 and thence to ground over the normal contact of limit switch L1. With the stator winding thus energized and the rotor winding energized by the firing of tube VT5 the motor M3 is operated in one direction of rotation and through the gear box 200 drives the shaft 201 in such a direction as to move the brush of potentiometer P1 in a clockwise direction toward the left terminal of its winding and to similarly advance the brushes of other potentiometers (not shown) which may be associated with the shaft 201.

Current from a source connected between the terminals 208 and 209 of the same frequency as the source connected between terminals 205, 206 and 206, 207 is impressed upon the divided secondary winding of transformer T3 and, since the mid-point of the secondary winding is grounded, potential of phase φ1 is applied over a circuit from ground, over the lower portion of such secondary winding, over the left portion of the winding of potentiometer P1 and the brush thereof, through resistance 210, condenser 202 and rheostat 203 to ground and at the same instant potential of phase φ2 is applied over a circuit from ground, over the upper portion of the secondary winding of transformer T3, over the right portion of the winding of potentiometer P1 and the brush thereof, through resistance 210, condenser 202 and rheostat 203 to ground. With the brush of potentiometer P1 engaging the midpoint of the potentiometer winding the potentials of opposite phases applied through resistance 210 will balance each other but, as the brush moves toward the left terminal of the potentiometer winding under the control of motor M3 as just described, potential of phase φ1 will increasingly predominate until such potential balances the potential of phase φ2 applied from the rough air circuit as previously described. As the unbalance decreases the potential impressed upon the grid of tube VT5 decreases resulting in the decrease in the speed of motor M3 until it finally stops when the potentiometer brush reaches a point where the potentials of opposite phase transmitted through the rheostat 203 are in balance and no signal potential is impressed upon the grid of tube VT5. Shaft 201 has now been set to a new angular position whereby the potentiometers associated therewith are instrumental in controlling other motor control circuits of the trainer which should be affected by a rough air condition affecting the elevator of an aircraft.

Among the circuits which are thus affected by the angle of attack motor control circuit are the pitch motor control circuit indicated by the box 311 of Fig. 3, the altimeter motor control circuit indicated by box 312 of Fig. 3 and the rate of climb motor control circuit indicated by the box 313 of Fig. 3. These motor control circuits are similar to those disclosed herein and are controlled by potentiometers on the shaft 201 of the angle of attack motor control circuit. The shaft of the angle of the pitch motor control circuit is instrumental in driving a synchro-generator which is electrically coupled with the synchro-repeater SR3 which in turn drives the horizon bar of the artificial horizon and bank indicator BI mounted on the pilot's instrument panel. The horizon bar of a similar instrument mounted on the instructor's desk is also driven by a synchro-repeated operated in parallel with the synchro-repeater SR3.

The shaft of the altimeter motor control circuit is instrumental in driving a synchro-generator which is electrically coupled with the synchro-repeater SR4 which in turn drives the altimeter ALT on the pilot's instrument panel. Also an altimeter driven by a synchro-repeater operated in parallel with the synchro-repeater SR4 is located on the instructors' desk.

The shaft of the rate of climb motor control circuit is instrumental in driving a synchro-generator which is electrically coupled with the synchro-repeater SR5 which in turn drives the rate of climb indicator RCI on the pilot's instrument panel. Also a rate of climb indicator driven by a synchro-repeater operated in parallel with the synchro-repeater SR5 is located on the instructor's desk.

It will be recalled that potential was applied from the rough air circuit through resistance 373 to the motor control circuit associated with the elevator loading mechanism 355. As fully disclosed in the copending application of Bohman et al., hereinbefore referred to the motor control circuit of the elevator loading mechanism is instrumental in controlling such mechanism to alter the loading applied to shaft 354 which change in the loading is communicated through the gear 353 and sector gear 352 to the yoke 350 and manifests itself to the trainee pilot as requiring, for example, a greater effort on his part to prevent a change in the position of the yoke.

One of the loading units, for example the unit for loading the yoke 350 is disclosed in more detail in Fig. 4. If the pilot should pull back on the yoke 350 or toward the right as viewed in Fig. 4, the movement of the yoke is transmitted through the cable 400 to the pulley 401 and thus to the shaft 402. The cable 400 for this purpose extends over idler pulleys 403 and 404, over pulleys 405 and 406 journaled between the side bars of a trim carriage 407 movable longitudinally with respect to the side members 408 and 409 of the mounting frame, and is wrapped around the pulley 401. Rotation of the shaft 402 is communicated through gears 410 and 411 whereby the loading pulley 413 is rotated in a counter-clockwise direction and whereby through the gears 414, 415 and 416 the rotor of motor M5 is rotated. As the pulley 413 rotates it exerts a pull on the upper cable 417 against the tension of the loading spring 418 whereby a resistance to the turning of pulley 412 is communicated by the cable 400 to the pulley 419 and appears on the yoke 350 as a load which the pilot must overcome to move the yoke. At the same time due to the step-up ratio of the gear train including gears 414, 415 and 416, the rotor of motor M5 is rotated in the field of such motor and since the rotor of such motor is short-circuited as illustrated in the upper right portion of Fig. 4, the motor serves as a dynamic brake to exert a drag which is communicated through the gearing, pulleys and cable 400 to the yoke to give the pilot the usual feel of the yoke. This drag is, as before described, augmented by the resistance due to the tensioning of spring 418.

To lessen the effort required to pull the yoke 350 back, the pilot may operate the elevator trimming wheel 420. In an actual aircraft the movement of the trimming wheel operates the trimming tab on the elevator downwardly so as to cause the elevator surface to move up and thereby force the nose of the airplane to rise. In the trainer this operation is simulated by the rotation of the trimming wheel 420 in such a direction that the brush of the trimming potentiometer P42 is moved counter-clockwise to thereby increase the phase φ1 potential applied over the circuit from the brush of potentiometer P42 through resistance 421, condenser 422 and the winding of rheostat R1 to ground whereby this phase φ1 potential overbalances the potential of phase φ2 applied over the brush of balancing potentiometer P41, over resistance 423, through condenser 422 and the winding of rheostat R1 to ground. Consequently a potential of phase φ1 derived from the rheostat R1 is applied to the input grid of tube VT41, is amplifier by such tube and is applied as a potential of phase φ1 upon the control grids of tubes VT44, VT45 and VT46.

Since the potential applied to the grid of tube VT46 is out of phase with the potential applied to the anode of such tube, tube VT46 does not become conducting and therefore relays 425 and 424 are not operated. Tubes VT44 and VT45 will, however, alternately fire to transmit positive impulses of current through the rotor circuit of motor M6 and, with the stator circuit of the motor completed from ground through the source of direct current B41, through lamp resistance 426, over the inner right back of relay 425, through the rotor circuit, over the outer right back contact of relay 425 and over the normal contacts of limit switch L42 to ground, the motor M6 rotates in such a direction as to rotate the lead screw 427 in a counter-clockwise direction to thereby move the trimming carriage 407 of the elevator loading and trimming mechanism toward the right as viewed in Fig. 4.

As the carriage moves toward the right, the rack 428 rotates the gear 429 and thereby rotates the brush of the balancing potentiometer P41 in a counter-clockwise direction. As the brush of potentiometer P41 thus moves, the potential of phase φ2 is increased, thereby reducing the unbalance of the control circuit and the value of the signaling potential which is applied to the grids of tubes VT44 and VT45. The motor M6 thereupon slows down and when the brush of potentiometer P41 is so positioned that the potential of phase φ2 applied thereover equals the potential of phase φ1 applied over the brush of potentiometer P42 no signaling potential will appear on the grids of tubes VT44 and VT45 and the motor M6 will thereupon come to rest.

The movement of the yoke 350 toward the right through the cable 400 causes the clockwise rotation of pulley 401 and consequently a counter-clockwise rotation of the loading pulley 413 which is restrained in its rotation through the heavy pull exerted by the upper cable 417 due to the loading spring 418. However, the movement of the trimming carriage 407 toward the right by the operation of motor M6 tends, through the cable 400, to cause pulley 401 to rotate in a counter-clockwise direction and consequently to cause the loading pulley 413 to rotate in a clockwise direction. Thus two opposite rotational forces are applied to the loading pulley 413, one by the movement of the yoke and the other by the operation of the trimming wheel 420. Thus if the trimming wheel is rotated sufficiently the effort required to move the yoke to the position required may be materially reduced or indeed the entire effort required to move the yoke may be supplied through the trimming carriage in response to the operation of the trimming wheel.

Similar assistance for moving the elevator in the opposite direction may be attained by the rotation of the elevator trimming wheel 420 in the opposite direction.

When potential is applied from the rough air circuit through resistance 373 to the motor control circuit of Fig. 4, as previously described, the motor M6 is caused to rotate in one or the other direction dependent upon the phase of the input potential to move the trimming carriage 407 of the loading mechanism to thereby change the loading applied to the yoke 350 in the same manner as when potential is applied under the control of the trimming potentiometer P42.

As switch M1 passes through positions 1 and 2, a circuit is also established from the phase φ2 source of alternating current connected to cam 124, over the upper left contact of cam 116, the lower left contact of cam 131, the right contact of cam 134 through resistance 148, over conductor 149, through condenser 302 and rheostat 303 to ground and in parallel therewith to ground through resistance 374 and also in parallel therewith through resistance 375 to the motor control circuit associated with the rudder loading mechanism 371.

The potential derived from the rheostat 303 is applied through resistance 304 to the control grid of the amplifier tube VT21, is amplified thereby and by the tube VT22 and is then impressed through the transformer T21 and through rectifier tube VT23 upon the control grid of tube VT25 and potential from the lower right secondary winding of transformer T21 is also impressed upon the control grid of tube VT26. Tubes VT25 and VT26 both become conducting and result in the operation of motor M5 in the manner previously described in connection with the operation of motor M3 to drive the shaft 301 through the reduction gear box 300 at a slow speed in a clockwise direction. The rotation of shaft 301 results in the movement of the brush of potentiometer P21 towards the left terminal of its winding and the similar movement of the brushes of other potentiometers (not shown) which may be associated with the shaft 301. Shaft 301 also rotates the rotor of synchro-generator SG2 resulting in the synchronous rotation of the rotor of synchro-repeater SR2. The rotor of synchro-repeater SR2 being connected to the rate of current indicator RTI changes the reading of such indicator. When the brush of the potentiometer P21 reaches a position in which the predominating potential of phase φ1 applied thereover, through resistance 310, through condenser 302 and rheostat 303, balances the potential applied through the rheostat from the rough air circuit, the motor M5 comes to rest. The shaft 301 has now been set to a new angular position whereby potentiometers associated therewith are instrumental in controlling other motor control circuits of the trainer which should be affected by a rough air condition affecting the rudder of an aircraft.

It is to be understood that in addition to the rate of turn indicator RTI mounted on the pilot's instrument panel a duplicate of such instrument driven by a synchro-repeater connected in parallel with the synchro-repeater SR2 would be mounted on the instructor's desk for observation by the instructor.

It will be recalled that potential was applied from the rough air circuit through resistance 375 to the motor control circuit associated with the rudder loading mechanism 371. As fully described in the application of Bohman et al. hereinbefore referred to, the motor control circuit of the rudder loading mechanism is instrumental in controlling such mechanism to alter the loading applied to shaft 370 which change in loading is communicated to the rudder pedals 360 and 363 and manifests itself to the trainee pilot as requiring, for example, a greater effort on his part to prevent a change in the incident position of the rudder pedals. The rudder loading mechanism is of substantially the same construction as the elevator loading mechanism shown in detail in Fig. 4.

As switch M1 passes through positions 1 to 3½, inclusive, a circuit is also established from the phase φ1 source of alternating current connected to cam 115, over the upper left contact of cam 109, over the lower left contact of cam 137, the lower right contact of cam 136, through resistance 150, over conductor 151, through condenser 252 and rheostat 253 to ground and in parallel therewith to ground through resistance 376 and also in parallel therewith through resistance 377 to the motor control circuit associated with the aileron loading mechanism 359. The aileron loading mechanism is of substantially the same construction as the elevator loading mechanism shown in detail in Fig. 4.

The potential derived from the rheostat 253 is applied through resistance 254 to the control grid of the amplifier tube VT11, is amplified thereby and by the tube VT12 and is then impressed through the transformer T11 and through rectifier tube VT13 upon the control grid of tube VT15, and from the lower secondary winding of transformer T11 upon the control grid of tube VT16. In the manner previously described tube VT15 will become conducting during each interval that positive potential is applied to its anode from the phase φ1 source of alternating current connected between the terminals 255 and 256 and will establish the rotor circuit of motor M4. Since, however, the potential applied to the input circuit of tube VT11 has resulted in the application of potential to the control grid of tube VT16 which is out of phase with the phase φ1 source of anode current connected between the terminals 256 and 257 and supplied to the anode of tube VT16, tube VT16 does not operate and relays 261 and 262 remain unoperated. The circuit through the stator winding of motor M4 may therefore be traced from ground through the source of direct current B4, over the inner right back contact of relay 262, through the stator winding of motor M4, over the outer right back contact of relay 261 and over the normal contact of limit switch L12 to ground.

With its stator and rotor windings thus energized motor M4 is operated in a direction of rotation to drive the shaft 251 through the reduction gear box 250 in a counter-clockwise direction. The rotation of shaft 251 results in the movement of the brush of potentiometer P11 toward the right terminal of its winding and the similar movement of the brushes of other potentiometers (not shown) which may be associated with the shaft 251. As the brush moves toward the right terminal of its winding potential of phase φ2 applied thereover from the upper portion of the secondary winding of transformer T13, through resistance 260, condenser 252 and rheostate 253 increasingly predominates until it balances the potential of phase φ1 applied through the rheostate 253 from the rough air circuit, at which time the motor M4 will come to rest. The shaft 251 has now been set to a new angular position whereby potentiometers associated therewith are instrumental in controlling other motor control circuits of the trainer which should be affected by a rough air condition affecting the ailerons of an aircraft.

The shaft 251 also rotates the rotor of synchrogenerator SG1 resulting in the synchronous rotation of the rotor of synchro-repeater SR1. The rotor of synchro-repeater SR1 being connected to the bank indicator and artificial horizon indicator BI mounted on the pilot's instrument panel, changes the reading of such bank indicator. It is to be understood that a similar indicator driven by a synchro-repeater connected in parallel with the synchro-repeater SR1 would be mounted on the instructor's desk for observation by the instructor.

As the switch M1 passes through positions 13 to 14½, inclusive, a circuit is established from the phase φ1 source of alternating current connected to cam 115, over the upper left contact of cam 107, over the lower left contact of cam 131, the right contact of cam 134, through resistance 148 and over conductor 149 to the rate of turn motor control circuit and to the motor control circuit associated with the rudder loading mechanism 371. Since potential of phase φ1 is now applied to these circuits the motors thereof are controlled to operate in the opposite direction of rotation from that previously described or in the manner described in connection with the operation of the motor M3 of the angle of attack motor control circuit, resulting in a reverse change in the loading applied to the rudder pedals 360 and 363 and a reverse setting of the rate of turn indicators RTI on the pilot's and instructor's instrument panels.

As the switch M1 passes through positions 15 to 17½, inclusive, a circuit is established from the phase φ2 source of alternating current connected to cam 124, over the upper left contact of cam 116, over the lower left contact of cam 131, the right contact of cam 134, through resistance 148 and over conductor 149 to the rate of turn motor control circuit and to the motor control circuit associated with the rudder loading mechanism 371. Since potential of phase φ2 is now applied to these circuits the motors thereof are controlled to operate in the opposite direction of rotation to that just described resulting in a reverse change in the loading applied to the rudder pedals and to a reverse setting of the rate of turn indicators.

As the switch M1 passes through positions 15 to 18, inclusive, a circuit is established from the phase φ1 source of alternating current connected to cam 115, over the lower left contact of cam 118, over the lower left contact of cam 141, the right contact of cam 143, through resistance 146 and over conductor 147 to the angle of attack motor control circuit and to the motor control circuit associated with the elevator loading mechanism 355. Since potential of phase φ1 is now applied to these circuits the motors thereof are controlled to operate in the opposite direction of rotation from that previously described or in the manner described in connection with the motor M4 of the bank motor control circuit, resulting in a reverse change in the loading applied to the yoke 250 and reverse settings of the horizon bars of the artificial horizon and bank indicators, reverse settings of the rate of climb indicators and reverse settings of the altimeters on the pilot's and instructor's instrument panels.

As the switch M1 passes through position 17 a circuit is established from ground over the lower left and upper right contacts of cam 105, through the winding of relay 152 to battery and ground, whereupon relay 152 operates and locks in a circuit through its winding over its upper contact, over the right contact of cam 130 of sequence switch M2, closed in position 1, to ground over the lower contact of cam 129 until switch M2 has been advanced out of position 1. Relay 152 also establishes a circuit from battery through the winding of relay 153, over the lower contact of relay 152, over the lower right and upper left contacts of cam 105, over the left contact of cam 130 to ground over the lower contact of cam 129 when switch M1 passes through position 18¾. Relay 153 thereupon operates and establishes the circuit of motor M2 which, through the gear box 126, rotates the shaft 128 of the sequence switch driven thereby. As the cam 129 driven by the shaft 128 rotates, it closes a holding circuit for relay 153 until the cam 129 is moved to a position indicative that the cams of the switch have been centered in the stopping position 2. Relay 153 then releases and the rotation of the sequence switch shaft is arrested. As cam 130 moves out of its No. 1 contact position into its No. 2 contact position, the locking circuit of relay 152 is opened and relay 152 releases.

With switch M2 now in position 2, the rotation of switch M1 through another complete revolution again establishes circuits from the phase φ1 and phase φ2 sources of alternating current to conductors 147, 149 and 151 and when it again reaches position 17 relay 152 is again operated followed by the operation of relay 153 when switch M1 reaches position 18¾ and the advance of switch M2 into position 3 is controlled in the manner just described. With sequence switch M2 now in position 3, the rotation of switch M1 through another complete revolution again establishes circuits from the phase φ1 and phase φ2 sources of alternating current to conductors 147, 149 and 151. In this manner as switch M1 makes successive revolutions, switch M2 is advanced from position to position until the instructor opens the start key K.

The following table indicates the controls exercised over the elevator, rudder and aileron loading mechanisms and the controls exercised over the angle of attack, rate of turn and bank motor control circuits during one complete cycling of the switches M1 and M2.

| Position of Switch M1 | Position of Switch M2 | Phase of Current | Loading Control | Motor Circuit Controlled |
|---|---|---|---|---|
| 1+ 3½ | 1 | φ1 | Aileron | Bank |
| 1+ 2 | 1 | φ2 | Elevator | Angle of Attack |
| 1+ 2 | 1 | φ2 | Rudder | Rate of Turn |
| 13+14½ | 1 | φ1 | ...do... | Do |
| 15+17½ | 1 | φ2 | ...do... | Do |
| 15+18 | 1 | φ1 | Elevator | Angle of Attack |
| 18¾ | 2 | | | |
| 6 | 2 | φ2 | Rudder | Rate of Turn |
| 6 | 2 | φ2 | Elevator | Angle of Attack |
| 7+7½ | 2 | φ1 | ...do... | Do |
| 14+18 | 2 | φ1 | Aileron | Bank |
| 16+18 | 2 | φ1 | Elevator | Angle of Attack |
| 18¾ | 3 | | | |
| 1+4 | 3 | φ2 | Aileron | Bank |
| 1+5 | 3 | φ2 | Elevator | Angle of Attack |
| 16+18 | 3 | φ1 | Aileron | Bank |
| 16+18 | 3 | φ1 | Rudder | Rate of Turn |
| 18¾ | 4 | | | |
| 5+ 7 | 4 | φ1 | Aileron | Bank |
| 5+ 7 | 4 | φ1 | Elevator | Angle of Attack |
| 11+12 | 4 | φ2 | Aileron | Bank |
| 12+13½ | 4 | φ1 | Rudder | Rate of Turn |
| 15+17 | 4 | φ1 | Aileron | Bank |
| 18¾ | 5 | | | |
| 2+ 5 | 5 | φ2 | Rudder | Rate of Turn |
| 2+ 5 | 5 | φ1 | Elevator | Angle of Attack |
| 6+ 7½ | 5 | φ1 | Rudder | Rate of Turn |
| 8+12 | 5 | φ2 | Aileron | Bank |
| 9+10 | 5 | φ2 | Elevator | Angle of Attack |
| 14+16 | 5 | φ1 | Aileron | Bank |
| 14+17 | 5 | φ2 | Elevator | Angle of Attack |
| 18¾ | 6 | | | |
| 4+ 5 | 6 | φ1 | ...do... | Do |
| 4+ 5 | 6 | φ1 | Rudder | Rate of Turn |
| 18¾ | 7 | | | |
| 1+ 2 | 7 | φ2 | Elevator | Angle of Attack |
| 2+ 3 | 7 | φ1 | Aileron | Bank |
| 2+ 7½ | 7 | φ1 | Elevator | Angle of Attack |
| 10+13 | 7 | φ1 | Rudder | Rate of Turn |
| 13+17½ | 7 | φ2 | Aileron | Bank |
| 14+16 | 7 | φ1 | Elevator | Angle of Attack |
| 17+18 | 7 | φ2 | Rudder | Rate of Turn |
| 18¾ | 8 | | | |
| 4+ 6½ | 8 | φ1 | Elevator | Angle of Attack |
| 4+ 6½ | 8 | φ2 | Rudder | Rate of Turn |
| 10+14 | 8 | φ2 | ...do... | Do |
| 14+18 | 8 | φ1 | Aileron | Bank |
| 15+18 | 8 | φ1 | Rudder | Rate of Turn |
| 18¾ | 9 | | | |
| 3+ 3½ | 9 | φ2 | Elevator | Angle of Attack |
| 3+ 3½ | 9 | φ2 | Aileron | Bank |
| 6+ 7½ | 9 | φ1 | Elevator | Angle of Attack |
| 6+ 7½ | 9 | φ1 | Aileron | Bank |
| 13+14 | 9 | φ1 | Elevator | Angle of Attack |
| 13+14 | 9 | φ1 | Rudder | Rate of Turn |
| 18¾ | 10 | | | |
| 1+ 5 | 10 | φ1 | Elevator | Angle of Attack |
| 7+10 | 10 | φ2 | ...do... | Do |
| 17+17½ | 10 | φ2 | Rudder | Rate of Turn |
| 18¾ | 11 | | | |
| 3+ 7½ | 11 | φ1 | Aileron | Bank |
| 3+ 7½ | 11 | φ1 | Elevator | Angle of Attack |
| 8+10 | 11 | φ2 | Aileron | Bank |
| 12+13½ | 11 | φ2 | Elevator | Angle of Attack |
| 12+13½ | 11 | φ2 | Aileron | Bank |
| 14+15 | 11 | φ2 | Elevator | Angle of Attack |
| 18¾ | 12 | | | |
| 3+ 3½ | 12 | φ2 | ...do... | Do |
| 4+ 8½ | 12 | φ1 | Rudder | Rate of Turn |
| 11+14 | 12 | φ2 | Aileron | Bank |
| 11+14 | 12 | φ2 | Rudder | Rate of Turn |
| 15+16 | 12 | φ1 | ...do... | Do |
| 17+18 | 12 | φ2 | ...do... | Do |
| 18 | 12 | φ2 | Aileron | Bank |
| 18¾ | 13 | | | |
| 1 | 13 | φ1 | Elevator | Angle of Attack |
| 8+12 | 13 | φ2 | Rudder | Rate of Turn |
| 9+11 | 13 | φ2 | Elevator | Angle of Attack |
| 12+14 | 13 | φ2 | ...do... | Do |
| 13+14 | 13 | φ1 | Rudder | Rate of Turn |
| 18¾ | 14 | | | |
| 2+ 4½ | 14 | φ1 | ...do... | Do |
| 4+ 5 | 14 | φ1 | Aileron | Bank |
| 14 | 14 | φ2 | Elevator | Angle of Attack |
| 16+18 | 14 | φ2 | ...do... | Do |
| 16+18 | 14 | φ2 | Rudder | Rate of Turn |
| 18¾ | 15 | | | |
| 4+ 6½ | 15 | φ2 | Aileron | Bank |
| 6+10 | 15 | φ2 | Elevator | Angle of Attack |
| 9+10½ | 15 | φ1 | Aileron | Bank |
| 15+18 | 15 | φ1 | ...do... | Do |
| 18¾ | 16 | | | |
| 3+ 4 | 16 | φ2 | ...do... | Do |
| 6+10 | 16 | φ1 | Elevator | Angle of Attack |
| 18¾ | 17 | | | |
| 7 | 17 | φ1 | ...do... | Do |
| 10+14½ | 17 | φ2 | Aileron | Bank |
| 13+14 | 17 | φ2 | Elevator | Angle of Attack |
| 17 | 17 | φ1 | Aileron | Bank |
| 18¾ | 18 | | | |
| 1+ 5½ | 18 | φ2 | ...do... | Do |
| 5+ 7 | 18 | φ1 | Elevator | Angle of Attack |

| Position of Switch M1 | Position of Switch M2 | Phase of Current | Loading Control | Motor Circuit Controlled |
|---|---|---|---|---|
| 5+ 7 | 18 | φ1 | Rudder | Rate of Turn. |
| 8+ 9½ | 18 | φ2 | Aileron | Bank. |
| 8+10 | 18 | φ2 | Elevator | Angle of Attack. |
| 9+11½ | 18 | φ2 | Rudder | Rate of Turn. |
| 13+14 | 18 | φ2 | Elevator | Angle of Attack. |
| 15+16 | 18 | φ1 | ----do---- | Do. |
| 18¾ | 1 | | | |

If it should be considered desirable for any reason to omit the control of any one of the loading mechanisms from the rough air motor control circuit the connection from the control conductor 147, 149 or 151 to such mechanism may be omitted. For example, if it should be desired to omit the control of the elevator loading mechanism 355 from the rough air circuit, the connection from conductor 147 through resistance 373 would be omitted.

What is claimed is:

1. In an aircraft trainer, a control member, means for applying a load to said control member in simulation of its operation under actual flight conditions, instruments for indicating different flight conditions, means for operating said instruments, an instructor's desk, motor-driven switching means for variably controlling said instrument operating means and said loading means to simulate the effect on the similar instruments of an aircraft and the effect on the response of the control of an aircraft when rough air conditions are encountered, and means at said desk for controlling said latter means.

2. In an aircraft trainer, an elevator control yoke, means for applying a load to said yoke in simulation of its operation under actual flight conditions, instruments for indicating different flight conditions, means for operating said instruments, an instructor's desk, motor-driven switching means for variably controlling said instrument operating means and said loading means to simulate the effect on the similar instruments of an aircraft and the effect on the response of the yoke of an aircraft when rough air conditions are encountered, and means at said desk for controlling said latter means.

3. In an aircraft trainer, aileron control means, means for applying a load to said control means in simulation of its operation under actual flight conditions, instruments for indicating different flight conditions, means for operating said instruments, an instructor's desk, motor-driven switching means for variably controlling said instrument operating means and said loading means to simulate the effect on the similar instruments of an aircraft and the effect on the response of the control means of an aircraft when rough air conditions are encountered, and means at said desk for controlling said latter means.

4. In an aircraft trainer, rudder control pedals, means for applying a load to said pedals in simulation of their operation under actual flight conditions, instruments for indicating different flight conditions, means for operating said instruments, an instructor's desk, motor-driven switching means for variably controlling said instrument operating means and said loading means to simulate the effect on the similar instruments of an aircraft and the effect on the response of the rudder control pedals of an aircraft when rough air conditions are encountered, and means at said desk for controlling said latter means.

5. In an aircraft trainer, an elevator control yoke, an aileron control wheel, rudder control pedals, means for applying loads to said control wheel and to said rudder pedals in simulation of their operation under actual flight conditions, instruments for indicating different flight conditions, means for operating said instruments, an instructor's desk, motor-driven switching means for variably controlling said instrument operating means and said loading means to simulate the effect on the similar instruments of an aircraft and the effect on the response of the aileron control wheel and rudder control pedals of an aircraft when rough air conditions are encountered, and means at said desk for controlling said latter means.

6. In an aircraft trainer, an elevator control yoke, an aileron control wheel, rudder control pedals, means for applying loads to said controls in simulation of their operation under actual flight conditions, instruments for indicating different flight conditions, means for operating said instruments, an instructor's desk, motor-driven switching means for variably controlling said instrument operating means and said loading means to simulate the effect of the similar instruments of an aircraft and the effect on the response of the controls of an aircraft when rough air conditions are encountered, and means at said desk for controlling said latter means.

7. In an aircraft trainer, an elevator control yoke, an aileron control wheel, rudder control pedals, means for applying loads to said control wheel and to said rudder pedals in simulation of their operation under actual flight conditions, an altimeter, a rate of climb indicator, a rate of turn indicator and an artificial horizon and bank indicator for indicating different flight conditions, means for operating said instruments, an instructor's desk, motor-driven switching means for variably controlling said instrument operating means and said loading means to simulate the effect on the similar instruments of an aircraft and the effect on the response of the controls of an aircraft when rough air conditions are encountered, and means at said desk for controlling said latter means.

8. In an aircraft trainer, an elevator control yoke, an aileron control wheel, rudder control pedals, means for applying loads to said controls in simulation of their operation under actual flight conditions, an altimeter, a rate of climb indicator, a rate of turn indicator, and an artificial horizon and bank indicator for indicating different flight conditions, means for operating said instruments, an instructor's desk, motor-driven switching means for variably controlling said instrument operating means and said loading means to simulate the effect on the similar instruments of an aircraft and the effect on the response of the controls of an aircraft when rough air conditions are encountered, and means at said desk for controlling said latter means.

9. In an aircraft trainer, an elevator control yoke, an aileron control wheel, rudder control pedals, means for applying loads to said controls in simulation of their operation under actual flight conditions, an angle of attack motor control circuit, a bank motor control circuit, a rate of turn motor control circuit, instruments for indicating different flight conditions controlled by said motor control circuits, an instructor's desk, motor-driven switching means for variably controlling said circuits and said loading means to simulate the effect on the similar instruments of an aircraft and the effect on the response of the controls of an aircraft when rough air conditions are encountered, and means at said desk for controlling said latter means.

10. In an aircraft trainer, an elevator control yoke, an aileron control wheel, rudder control pedals, means for applying loads to said controls in simulation of their operation under actual flight conditions, an altimeter, a rate of climb indicator, a rate of turn indicator, a bank indicator, and an artificial horizon instrument for indicating different flight conditions, an angle of attack motor control circuit for controlling said altimeter, rate of climb indicator and artificial horizon instrument, a bank motor control circuit for controlling said bank indicator, a rate of turn motor control circuit for controlling said rate of turn indicator, an instructor's desk, motor-driven switching means for variably controlling said circuits and said loading means to simulate the effect on the similar instruments of an aircraft and the effect on the response of the controls of an aircraft when rough air conditions are encountered, and means at said desk for controlling said latter means.

11. In an aircraft trainer, an elevator control yoke, an aileron control wheel, rudder control pedals, means for applying loads to said controls in simulation of their operation under actual flight conditions, instruments for indicating different flight conditions, sources of potential, a first switch, a second switch, means for advancing said second switch through one cycle in response to the completion of a plurality of cycles by said first switch, a plurality of circuit paths conjointly established by said switches in the different positions thereof, an instructor's desk, and means controlled from said desk for causing the cycling of said switches to apply potentials from said sources over said circuit paths to variably control said instruments and said loading means to simulate the effect on the similar instruments of an aircraft and the effect of the response of the controls of an aircraft when rough air conditions are encountered.

12. In an aircraft trainer, an elevator control yoke, an aileron control wheel, rudder control pedals, means for applying loads to said controls in simulation of their operation under actual flight conditions, instruments for indicating different flight conditions, sources of potential, a first switch, a second switch, means for advancing said second switch through one cycle in response to the completion of a plurality of cycles by said first switch, a plurality of control paths conjointly established by said switches in the different positions thereof, an instructor's desk, means controlled from said desk for causing the cycling of said switches to apply potentials from said sources over said circuit paths to variably control said instruments and said loading means to simulate the effect on the similar instruments of an aircraft and the effect on the response of the controls of an aircraft when rough air conditions are encountered, and means at the instructor's desk for varying the speed at which said first switch is operated to vary the duration of the intervals during which said potentials are applied and thereby the duration of the rough air effects.

13. In an aircraft trainer, an elevator control yoke, an aileron control wheel, rudder control pedals, means for applying loads to said controls in simulation of their operation under actual flight conditions, instruments for indicating different flight conditions, sources of potential, a first switch, a second switch, means for advancing said second switch through one cycle in response to the completion of a plurality of cycles by said first switch, a plurality of circuit paths conjointly established by said switches in the different positions thereof, an instructor's desk, means controlled from said desk for causing the cycling of said switches to apply potentials from said sources over said circuit paths to variably control said instruments and said loading means to simulate the effect on the similar instruments of an aircraft and the effect on the response of the controls of an aircraft when rough air conditions are encountered, means at the instructors's desk for varying the speed at which said first switch is operated to vary the duration of the intervals during which the potentials are applied and thereby the duration of the rough air effects, and rheostats at said desk for varying said potentials to thereby vary the intensity of the rough air effects.

14. In an aircraft trainer, an elevator control yoke, an aileron control wheel, rudder control pedals, means for applying loads to said controls in simulation of their operation under actual flight conditions, instruments for indicating different flight conditions, sources of potential, a first motor driven switch, a second motor switch operable through one cycle in response to the completion of a plurality of cycles by said first switch, a plurality of circuit paths conjointly established by said switches in different contact closing positions thereof, an instructor's desk, a start key at said desk for establishing an operating circuit for the motor of said first switch and for connecting said sources of potential to contacts of said switches whereby said switches are caused to cycle and apply potentials from said sources over said circuit paths to variably control said instruments and said loading means to simulate the effect on the similar instruments of an aircraft and the effect on the response of the controls of an aircraft when rough air conditions are encountered, a rheostat at said desk in the motor circuit of said first switch to vary the speed at which said first switch is operated to vary the duration of the intervals during which said potentials are applied and thereby the duration of the rough air effects, and rheostats at said desk for varying said potentials to thereby vary the intensity of the rough air effects.

CHARLES E. GERMANTON.

REFERENCES CITED

The following references are of record in the file of this patent:

UNITED STATES PATENTS

| Number | Name | Date |
|---|---|---|
| 1,393,456 | Ruggles | Oct. 11, 1921 |
| 1,865,828 | Buckley | June 5, 1932 |
| 1,960,350 | Shackleton | May 29, 1934 |
| 2,099,857 | Link | Nov. 23, 1937 |
| 2,155,346 | Davis | Apr. 18, 1939 |
| 2,164,412 | Koster | July 4, 1939 |
| 2,306,429 | Edwards | Dec. 29, 1942 |
| 2,336,711 | Barber | Dec. 14, 1943 |
| 2,366,603 | Dehmel | Jan. 2, 1940 |

FOREIGN PATENTS

| Number | Country | Date |
|---|---|---|
| 548,093 | Great Britain | 1942 |